US012568199B2

(12) United States Patent (10) Patent No.: US 12,568,199 B2

Deng et al. (45) Date of Patent: Mar. 3, 2026

(54) IMAGE DISPLAY METHOD, DEVICE, AND APPARATUS

(71) Applicant: Lenovo (Beijing) Limited, Beijing (CN)

(72) Inventors: Yuanyuan Deng, Beijing (CN); Xi Wan, Beijing (CN); Yinzhu Piao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 228 days.

(21) Appl. No.: 18/514,865

(22) Filed: Nov. 20, 2023

(65) Prior Publication Data

US 2024/0171728 A1 May 23, 2024

(30) Foreign Application Priority Data

Nov. 22, 2022 (CN) .......................... 202211468155.9

(51) Int. Cl.
| | |
|---|---|
| *H04N 13/366* | (2018.01) |
| *H04N 13/00* | (2018.01) |
| *H04N 13/15* | (2018.01) |
| *H04N 13/302* | (2018.01) |
| *H04N 13/398* | (2018.01) |

(52) U.S. Cl.
CPC .......... *H04N 13/398* (2018.05); *H04N 13/15* (2018.05); *H04N 13/366* (2018.05); *H04N 2013/0077* (2013.01); *H04N 13/302* (2018.05)

(58) Field of Classification Search
CPC ...... G06F 3/011; G06F 3/04815; G06T 19/20; G06T 2219/2012; G06T 2219/2016; H04N 13/128; H04N 13/15; H04N 13/302; H04N 13/366; H04N 13/398; H04N 2013/0077
See application file for complete search history.

(56) References Cited

U.S. PATENT DOCUMENTS

| | | | |
|---|---|---|---|
| 2010/0208040 A1* | 8/2010 | Guillou ................ | H04N 13/183 348/51 |
| 2011/0304693 A1* | 12/2011 | Border ................. | H04N 13/261 348/46 |
| 2023/0214011 A1* | 7/2023 | Rönngren ............ | G06V 40/193 345/427 |

* cited by examiner

*Primary Examiner* — Sing-Wai Wu

(74) *Attorney, Agent, or Firm* — ANOVA LAW GROUP, PLLC

(57) ABSTRACT

An image display method includes determining a first position and a second position in a target interface and transforming a display position of a target element in the target interface from the first position to the second position. The target interface is a stereoscopic interface perceived by a viewer through one or more images, and the first position and the second position have different depth values. During a transformation process, the target element has an intermediate display position, and a depth value of the intermediate display position is between a depth value of the first position and a depth value of the second position.

15 Claims, 4 Drawing Sheets

Determine a first position and a second position in a target interface, the target interface being a stereoscopic interface perceived by a viewer through an image, and the first position and the second position having different depths — S110

Transform a display position of a target element in the target interface from the first position to the second position, the target element having a middle display position in the changing process, and the depth value of the middle display position being between the depth value of the first position and the depth value of the second position — S120

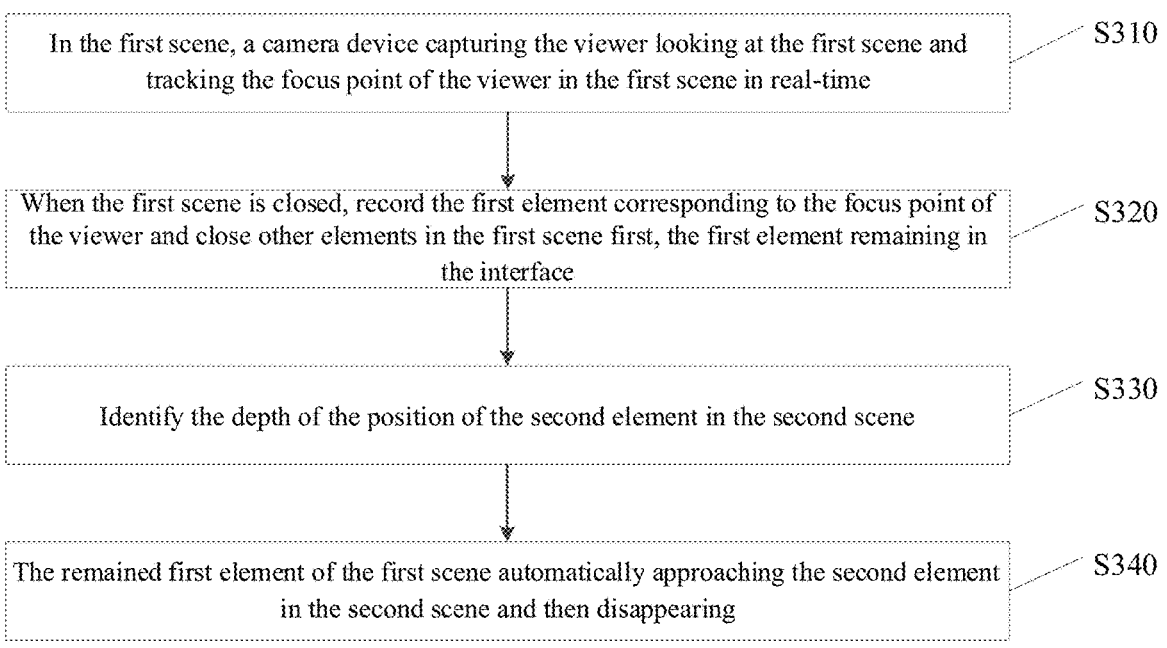

In the first scene, a camera device capturing the viewer looking at the first scene and tracking the focus point of the viewer in the first scene in real-time — S310

When the first scene is closed, record the first element corresponding to the focus point of the viewer and close other elements in the first scene first, the first element remaining in the interface — S320

Identify the depth of the position of the second element in the second scene — S330

The remained first element of the first scene automatically approaching the second element in the second scene and then disappearing — S340

FIG. 3

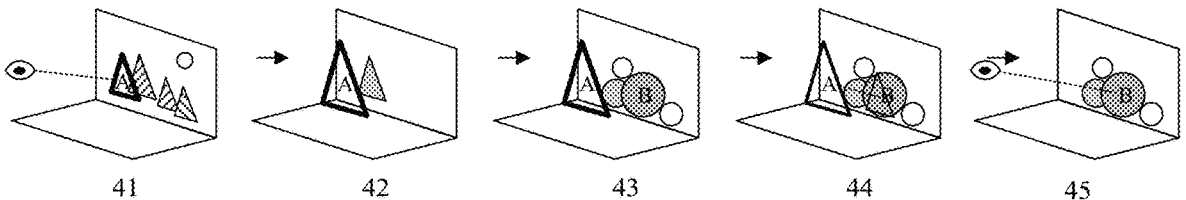

IMAGE DISPLAY METHOD, DEVICE, AND APPARATUS

CROSS-REFERENCE TO RELATED APPLICATION

The present disclosure claims priority to Chinese Patent Application No. 202211468155.9, filed on Nov. 22, 2022, the entire content of which is incorporated herein by reference.

TECHNICAL FIELD

The present disclosure relates to the image processing field and, more particularly, to an image display method, an image display device, and an image display apparatus.

BACKGROUND

When a user uses a naked-eye 3D laptop, if the depths of two switching scenes are different, the user experiences eye discomfort because of loss of focus when the depths suddenly change in the scene-switching process. Thus, the user cannot see clearly or find the content on the screen.

SUMMARY

Embodiments of the present disclosure provide an image display method. The method includes determining a first position and a second position in a target interface and transforming a display position of a target element in the target interface from the first position to the second position. The target interface is a stereoscopic interface perceived by a viewer through one or more images, and the first position and the second position have different depth values. During a transformation process, the target element has an intermediate display position, and a depth value of the intermediate display position is between a depth value of the first position and a depth value of the second position.

Embodiments of the present disclosure provide an image display device, including a determination module and a transformation module. The determination module is configured to determine a first position and a second position in a target interface. The target interface is a stereoscopic interface perceived by a viewer through one or more images, and the first position and the second position have different depth values. The transformation module is configured to transform a display position of a target element in the target interface from the first position to the second position. During a transformation process, the target element has an intermediate display position, and the depth value of the intermediate display position is between a depth value of the first position and a depth value of the second position.

Embodiments of the present disclosure provide an electronic device, including a processor and a memory. The memory stores a computer program that, when executed by the processor, causes the processor to determine a first position and a second position in a target interface and transformed a display position of a target element in the target interface from the first position to the second position. The target interface is a stereoscopic interface perceived by a viewer through one or more images, and the first position and the second position have different depth values. During a transformation process, the target element have an intermediate display position, and a depth value of the intermediate display position is between a depth value of the first position and a depth value of the second position.

BRIEF DESCRIPTION OF THE DRAWINGS

FIG. 3 illustrates a schematic flowchart of a method for helping a user maintain focus with autostereoscopy according to some embodiments of the present disclosure.

FIG. 4 illustrates a schematic diagram of switching a scenario according to some embodiments of the present disclosure.

DETAILED DESCRIPTION OF THE EMBODIMENTS

To make purposes, technical solutions, and advantages of embodiments of the present disclosure clearer, the technical solutions of embodiments of the present disclosure are further described in detail in connection with the accompanying drawings of the present disclosure. Embodiments of the present disclosure are used to describe not limit the present disclosure.

In the descriptions below, the term "some embodiments" refers to a subset of all possible embodiments. In some embodiments, "some embodiments" can refer to the same subset or different subsets of all possible embodiments and can be combined when there is no conflict.

In the description below, the terms "first," "second," "third," etc., are merely used to distinguish similar objects and do not imply a specific order for these objects. "first," "second," "third," etc., can be interchanged in specific sequences or orders. Thus, embodiments of the present disclosure can be implemented in a sequence other than the sequence shown or described here.

Unless otherwise defined, all technical and scientific terms used here have the same meanings as those generally understood by those skilled in the art. The terms used here are merely intended to describe not limit the purpose of embodiments of the present disclosure.

Figure 1:
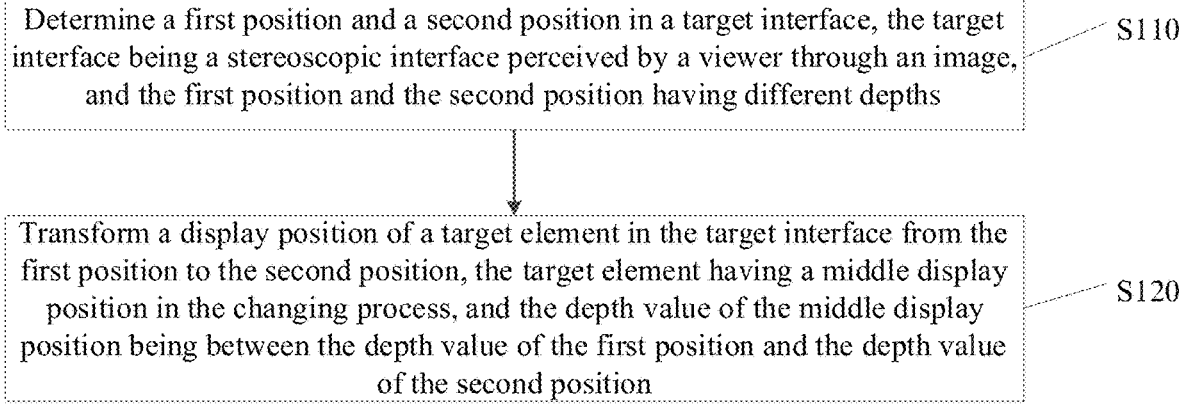
FIG. 1 illustrates a schematic flowchart of an image display method according to some embodiments of the present disclosure.

Embodiments of the present disclosure provide an image display method. As shown in FIG. 1, the method includes the following processes.

At S110, a first position and a second position are determined in a target interface. The target interface is a stereoscopic interface perceived by a viewer through one or more images. The first position and the second position have different depths.

Here, the target interface can be a stereoscopic interface, for example, an interface presented with an autostereoscopy effect. Autostereoscopy is a general term for technologies that achieve stereoscopic vision without external tools such as polarized glasses. The technologies can include lenticular screen technology and cylindrical lens technology. The target interface can also be another form of a stereoscopic interface perceived by the viewer. The representation of the stereoscopic interface is not limited here.

In some embodiments, the first position and the second position can be two positions with different depth values in the same scene or two positions with different depth values in different scenes. In the stereoscopic interface, each position can have a plane coordinate and a depth value. For two display elements with different depth values, the viewer can perceive that the two display elements are displayed at different depths. The depth value of the first position can be determined based on the depth value of the object located at the first position. The depth value of the second position can be determined based on the depth value of the object located at the second position. For example, in the same interface presented with the autostereoscopy effect, the first position and the second position with different depth values may exist. In two interfaces presented with the autostereoscopy effect, the first position and the second position with different depth values may also exist.

At S120, a display position of a target element in the target interface is changed from the first position to the second position. The target element has a middle display position in the changing process. The depth value of the middle display position is between the depth value of the first position and the depth value of the second position.

The target element can be an object at the first position or a generated element generated in the target interface and configured to guide the user to observe the change in depth. For example, the target element can be a person, a tree, or an animal at the first position in the target interface or an icon generated at the first position. The form of the icon is not limited.

In some embodiments, changing the display position of the target element from the first position to the second position can include continuously moving the target element from the first position to the second position. For example, the target element in the first interface can be continuously moved to the second position in the second interface. Continuous movement can refer to the position of the target element perceived by the viewer changing continuously in the moving process of the target element, including changes in a plane direction and a depth direction, which are continuous changes perceived by the viewer. The continuous change can be implemented when the change value of the target element in two neighboring frames displayed in the stereoscopic interface is smaller than the position change threshold.

In some embodiments, changing the display position of the target element from the first position to the second position can also include the target element following the position of the viewer focus point position in real-time. When the focus point coincides with another image, the target element can be continuously changed from the original depth value (the depth value of the first position) to the depth value of the image (the depth value of the second position).

In some embodiments, when the target element is changed from the first position to the second position, the depth value of the target element can also change to gradually transition from the depth value of the first position to the depth value of the second position. For example, when the depth value at the first position is greater than the depth value at the second position, the depth value of the target element can change from large to small. The depth value of the target element can be the same as the depth value of the second position after the target element is moved to the second position. When the depth value of the first position is smaller than the depth value of the second position, the depth value of the target element can be changed from small to large. The depth value of the target element can be the same as the depth value of the second position after the target element is moved to the second position.

In embodiments of the present disclosure, first, the first position and the second position can be determined in the target interface. The target interface can be a stereoscopic interface perceived by the viewer through the image. The first position and the second position can have different depth values. Then, the display position of the target element in the target interface can be changed from the first position to the second position. During the transition process, the target element can have a middle display position. The depth value of the middle display position can be between the depth value of the first position and the depth value of the second position. Thus, when the user watches images corresponding to the first position and the second position with different depth values, the user can be guided to perceive images with different depths through the continuous change in the depth value of the target element, which can avoid the discomfort caused by a sudden change.

Figure 2A:
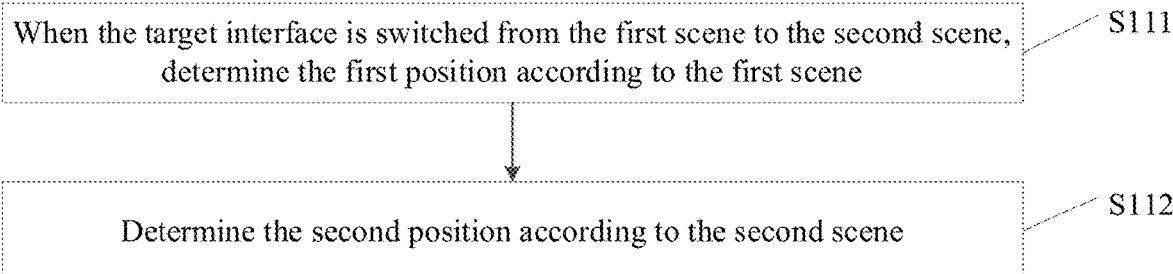
FIG. 2A illustrates a schematic flowchart of a method for determining a first position and a second position according to some embodiments of the present disclosure.

In some embodiments, as shown in FIG. 2A, determining the first position and the second position in the target interface includes the following processes.

At S111, when the target interface is switched from the first scene to the second scene, the first position is determined according to the first scene.

Figure 2B:
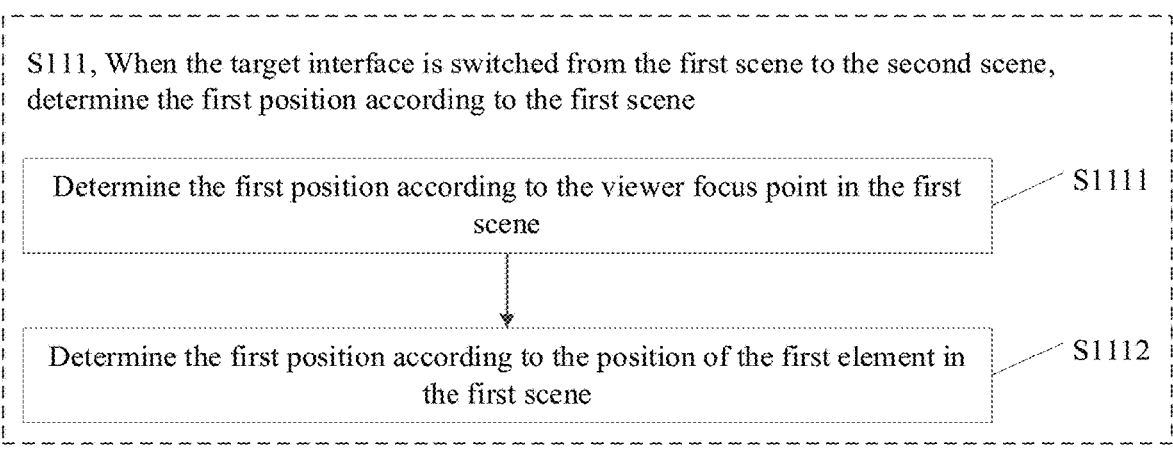
FIG. 2B illustrates a schematic flowchart of a method for determining a first position according to some embodiments of the present disclosure.

In some embodiments, as shown in FIG. 2B, determining the first position according to the first scene includes the following processes.

At S1111, the first position is determined according to the viewer focus point in the first scene.

In some embodiments, the viewer focus point in the first scene can be determined using a camera device. The position of the focus point can be determined as the first position.

At S1112, the first position is determined according to the position of the first element in the first scene.

In some embodiments, the first element in the first scene can be determined first. Then, the position of the first element can be determined as the first position. For example, an object with a display effect in the first scene closest to the viewer can be determined as the first element, or an object that can be controlled by the user in the first scene can be determined as the first element. In some other embodiments, an object that is prominently displayed in the first scene can be determined as the first element.

In embodiments of the present disclosure, the position that the viewer is currently watching can be determined the first position based on the viewer focus point. In some other embodiments, the position of the first element can also be determined as the first position. At least two effective methods for determining the first position can be provided.

Figure 2C:
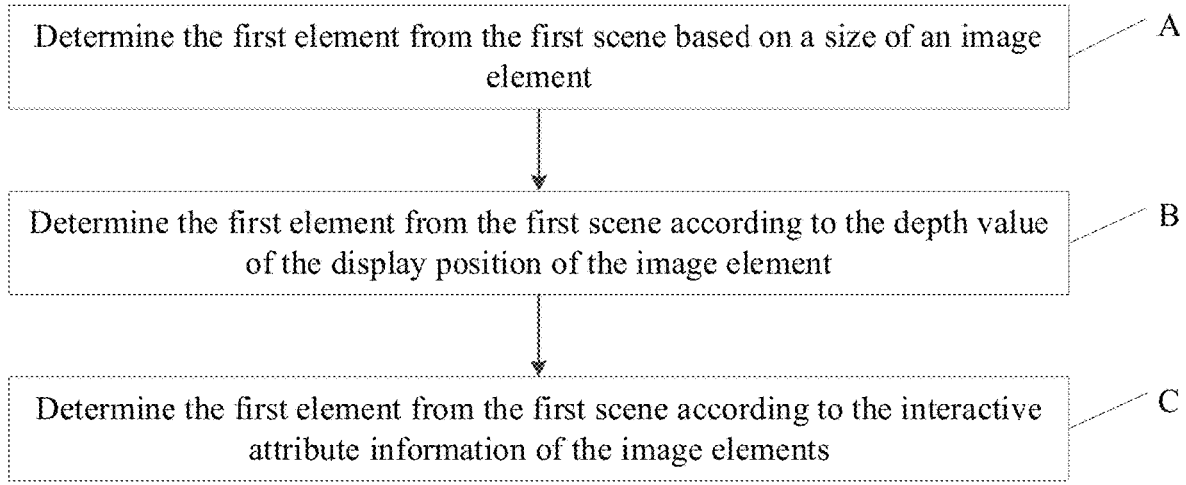
FIG. 2C illustrates a schematic flowchart of a method for determining a first element according to some embodiments of the present disclosure.

In some embodiments, as shown in FIG. 2C, "the first element" is also determined from one of the following processes.

At A, the first element is determined from the first scene based on a size of an image element.

In some embodiments, since a plurality of image elements are provided in the first scene, the image elements can be sorted based on sizes of the image elements. Then, since the image element with a largest size can have a largest visual impact on the user, the image element with the largest size can be determined as the first element.

At B, the first element is determined from the first scene according to the depth value of the display position of the image element.

In some embodiments, the image elements can also be sorted based on the depth values of the image elements. Then, the image element with the display effect closest to the user can be determined as the first element.

At C, the first element is determined from the first scene according to the interactive attribute information of the image elements.

The interactive attribute information of the image elements can be information provided for the viewer to interact with the image elements. Whether the image element can interact with the viewer and whether the image element is interacting with the viewer can be determined based on the interactive attribute information.

In some embodiments, an image element interacting with the viewer can be determined in the first scene based on the interactive attribute information of the image elements. Then, the image element can be determined as the first element. That is, the focus point of the user can focus on the image element.

In some embodiments, a plurality of image elements interacting with the viewer can be determined in the first scene based on the interactive attribute information of the image elements. An image element that is interacting with the viewer can be further determined. The image element that is interacting with the viewer can be determined as the first element. That is, the focus point of the user is currently focusing on the image element.

For example, the image element can be a vehicle steering wheel that provides an interactive function to the user, and the user is currently manipulating the vehicle steering wheel. Then, the vehicle steering wheel can be determined as the first element.

In embodiments of the present disclosure, the first element can be determined from the first scene according to the sizes of the image elements. In some other embodiments, the first element can be determined from the first scene according to the depth values of the display positions of the image elements. In some other embodiments, the first element can be determined from the first scene according to the interactive attribute information of the image elements. Thus, at least three methods can be provided for determining the first element. In some embodiments, only one of the above methods can be provided to effectively determine the first element. In some other embodiments, two or three of the above methods can be provided to determine the first element.

At S112, the second position is determined according to the second scene.

In some embodiments, similar to determining the first position in the first scene, the second position can be determined according to the viewer focus point in the second scene, and the second position can be determined according to the second element in the second scene.

In some embodiments, similar to determining the first element in the first scene, the second element can be determined from the second scene according to the size of the image elements. In some other embodiments, the second element can be determined from the second scene according to the depth value of the display position of the image elements. In some other embodiments, the second element can be determined from the second scene according to the interactive attribute information of the image elements.

In embodiments of the present disclosure, when the target interface is switched from a first scene to a second scene, the first position can be determined based on the first scene, and the second position can be determined based on the second scene. Thus, the first position and the second position with different depth values can be determined in the first scene and the second scene, respectively.

In some embodiments, the target element can be the image element at the first position in the first scene.

The first scene can include a plurality of image elements. For example, when the first scene is a scenic view, a tree, a cloud, or a lake in the first scene can be used as the target element at the first position. When the first scene is a scene of indoor conversation between people, a person in the scene can be used as the target element at the first position.

In embodiments of the present disclosure, the image element at the first position in the first scene can be used as the target element to guide the viewer to view a next scene.

In some embodiments, the display position of the target element can move by following the sight of the viewer. When the sight of the viewer coincides with the target element and the second element in the target interface, and the depth values corresponding to the target element and the second element are different, the first position can be the position where the target element is located, and the second position can be the position where the second element is located.

In some embodiments, the target element can follow the sight of the viewer to determine that the depth value of the focus point of the viewer stopping at the second position is different from the depth value of the target element. In some other embodiments, the target element can first guide the viewer to move to guide the viewer to look at the second focus point (the second element). The target element and the second element can have different depth values. The guidance can start from the first position and end at the second position.

For example, when a user views an exhibition hall on a stereoscopic interface, the current exhibit that the user is currently viewing can be determined as the target element. The sight of the viewer can be followed. When the next exhibit viewed by the user and the current exhibit have different depths, the current exhibit can be at the first position, and the next exhibit can be at the second position.

For another example, when a user views a complete house introduction including a plurality of rooms in a stereoscopic interface, a guidance sign (target element) can be generated at the first focus point (the first room) of the user. The guidance sign can first guide the user to move to guide the user to look at the second focus point (the second room). The first room and the second room can have different depth values. The guidance starts at the first position and ends at the second position.

In embodiments of the present disclosure, the display position of the target element follows the sight of the viewer to move. When the sight of the viewer coincides with the target element and the second element in the target interface, and the target element and the second element have different depth values, the first position can be the location of the target element, and the second position can be the location of the second element. Thus, before the viewer looks at the image having a different depth value from the current depth value, the viewer can be guided to effectively prevent the viewer from viewing an object directly changing from a depth value to another depth value.

In some embodiments, when the sight of the viewer moves away from the second element and does not coincide with any other elements except the target element, the depth value of the target element can remain unchanged during the movement. The other elements may not include a background image.

In some embodiments, when the sight of the viewer moves away from the second element and does not coincide with other elements except the target element, the sight of the viewer may not have focused on a next element except the background image. That is, the sight of the viewer can be in the process of continuous movement and may not have focused on the next element. In this process, the target element can move to maintain the depth value before moving unchanged, which avoids the discomfort of the viewer due to the change in the depth value.

In some embodiments, when the sight of the viewer moves away from the second element and does not coincide with other elements, to avoid discomfort due to the change in the depth value, the depth value of the target element can remain unchanged during the movement.

In some embodiments, transforming the display position of the target element in the target interface from the first position to the second position includes the following processes.

At 121, during the transformation process, the color of the target element is faded to cause the target element to disappear at the second position.

At 122, during the transformation process, the size of the target element is reduced to cause the target element to disappear at the second position.

In some embodiments, the color of the target element can be gradually faded. In some other embodiments, the size of the target element can be gradually reduced. In some other embodiments, the color of the target element can be faded, while the size of the target element can be reduced. Thus, after the guidance is performed using the target element, the target element can disappear at the second position, which does not impact the viewing effect of the user.

In embodiments of the present disclosure, a method for maintaining the focus point of the user with the autostereoscopy. As shown in FIG. 3, the method includes the following processes.

At S310, in the first scene, a camera device captures the viewer looking at the first scene and tracks the focus point of the viewer in the first scene in real-time.

At S320, when the first scene is closed, the first element corresponding to the focus point of the viewer is recorded, other elements in the first scene are closed first, and the first element remains in the interface.

At S330, the depth of the position of the second element in the second scene is identified.

At S340, the remained first element of the first scene automatically approaches the second element in the second scene and then disappears.

In embodiments of the present disclosure, when scenes are switched, the first element of the first scene can be used to guide the user to be smoothly transitioned to view the second element of the second scene. The first element and the second element have different depths.

FIG. 4 illustrates a schematic diagram showing scene switching according to some embodiments of the present disclosure. As shown in FIG. 4, interface schematic diagrams 41, 42, 43, 44, and 45 of the switching process are included.

Schematic diagram 41 shows tracking the focus point position of the user and identifying the object (the first element) A at the focus point in the first scene.

Schematic diagram 42 shows that after the first scene is closed, object A at the focus position does not disappear and gradually moves out of the screen to achieve an out-of-screen effect.

The out-of-screen effect can be defined as the user seeing object A at a distance of about 10 cm from the screen.

Schematic diagram 43 shows obtaining the main subject element in the second scene.

Frontmost object B in the second scene can be selected as the main subject element (the second element) by default.

Schematic diagram 44 shows that first element A gradually disappears after first element A moves to the position of second element B in the second scene.

Schematic diagram 45 shows that the focus point of the user is naturally transitioned onto second element B.

In embodiments of the present disclosure, when the user views the first scene with the stereoscopic effect that is switched to the second scene, by obtaining the focus point of the user before switching the scene, the user can be ensured to always have a focus point in the image. Thus, the user may not lose focus during the viewing process. The user can see the content on the screen more easily. The user can easily view the switching of the scenes with different depths.

Based on the above, embodiments of the present disclosure provide an image display device including various modules. The various modules can include various sub-modules. The various sub-modules can include units, which can be realized by a processor of an electronic device or specific logic circuits. In some embodiments, the processor can include a central processing unit (CPU), a microprocessor unit (MPU), a digital signal processor (DSP), a field programmable gate array (FPGA), etc.

Figure 5:
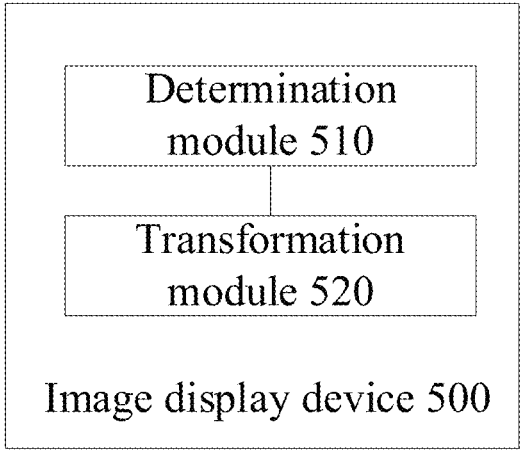
FIG. 5 illustrates a schematic structural diagram of an image display device according to some embodiments of the present disclosure.

FIG. 5 illustrates a schematic structural diagram of an image display device 500 according to some embodiments of the present disclosure. As shown in FIG. 5, the device 500 includes a determination module 510 and a transformation module 520.

The determination module 510 can be configured to determine the first position and the second position in the target interface. The target interface is a stereoscopic interface perceived by a viewer through the one or more images. The first position and the second position have different depth values.

The transformation module 520 can be configured to transform the display position of the target element in the target interface from the first position to the second position. During the transformation process, the target element can have the intermediate display position. The depth value of the intermediate display position can be between the depth value of the first position and the depth value of the second position.

In some embodiments, the determination module 510 can be further configured to determine the first position according to the first scene and the second position according to the second scene when the target interface is transitioned from the first scene to the second scene.

In some embodiments, the determination module 510 can include one of a first determination sub-module and a second determination sub-module. The first determination sub-module can be configured to determine the first position according to the focus point of the user in the first scene. The second determination sub-module can be configured to determine the first position according to the position of the first element in the first scene.

In some embodiments, the determination module 510 can include one of a third determination sub-module, a fourth determination sub-module, and a fifth determination sub-module. The third determination sub-module can be configured to determine the first element in the first scene according to the size of image elements. The fourth determination sub-module can be configured to determine the first element in the first scene according to the depth value of the display position of the image element. The fifth determination sub-module can be configured to determine the first element in the first scene according to the interactive attribute information of the image elements.

In some embodiments, the target element can be the image element at the first position in the first scene.

In some embodiments, the display position of the target element can follow the sight of the viewer to move. When the target element and the second element in the target interface coincide with the sight of the viewer and have different depth values, the first position can be the position of the target element, and the second position can be the position of the second element.

In some embodiments, when the sight of the viewer moves away from the second element and does not coincide with other elements except the target element, the depth value of the target element can remain unchanged in the movement process. The other elements may not include the background image.

In some embodiments, the transformation module 520 can include one of a color fading sub-module and a shrinking sub-module. The color fading sub-module can be configured to fade the color of the target element in the transformation process to cause the target element to disappear at the second position. The shrinking sub-module can be configured to shrink the size of the target element during the transformation process to cause the target element to disappear at the second position.

The description of device embodiments is similar to description of method embodiments and has a similar beneficial effect as method embodiments. For the technical details undisclosed in embodiments of the present disclosure, reference can be made to the description of method embodiments of the present disclosure.

In some embodiments of the present disclosure, if the above method is implemented in the form of software functional modules and sold or used as independent products, the method can also be stored in a computer-readable storage medium. Based on this understanding, the technical solution of embodiments of the present disclosure or the part contributing to the relevant technology can be embodied in the form of a software product stored in the storage medium. The computer software product can include instructions used to cause the electronic device (a cellphone, a tablet computer, a laptop computer, a desktop computer, etc.) to perform all or a part of the method of embodiments of the present disclosure. The storage medium can include a medium that can be used to store program codes, such as a USB flash drive, a portable hard drive, read-only memory (ROM), a magnetic disk, or an optical disk. Thus, embodiments of the present disclosure are not limited to any specific combination of hardware and software.

Correspondingly, embodiments of the present disclosure provide a storage medium. The storage medium includes a computer program. The computer program can be performed by the processor to implement the processes of the image display method of embodiments of the present disclosure.

Figure 6:
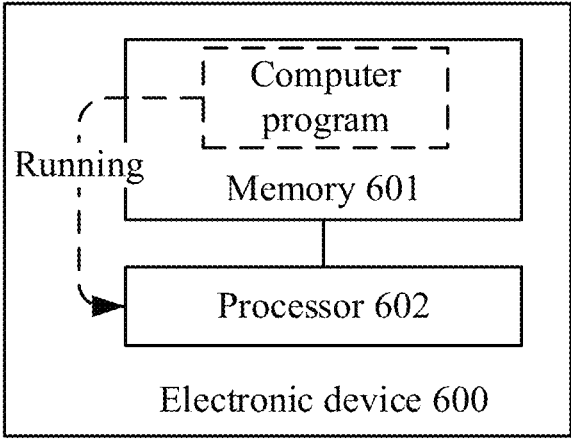
FIG. 6 illustrates a schematic diagram of an electronic device according to some embodiments of the present disclosure.

Correspondingly, embodiments of the present disclosure provide an electronic device. FIG. 6 illustrates a schematic diagram of an electronic device 600 according to some embodiments of the present disclosure. As shown in FIG. 6, the hardware of the device 600 includes a memory 601 and a processor 602. The memory 601 can store the computer program running on the processor 602. When the processor 602 executes the program, the processes of the image display method of embodiments of the present disclosure can be performed.

The memory 601 can be used to store instructions and applications that can be executed by the processor 602 and cache data to be processed or already processed by various modules in the processor 602 and the electronic device 600 (e.g., image data, audio data, voice communication data, and video communication data), which can be implemented through flash memory or random access memory (RAM).

The description of the storage medium and device embodiments above is similar to the description of the method embodiments and has similar beneficial effects as the method embodiments. For technical details not disclosed in the storage medium and device embodiments of the present disclosure, reference can be made to the description of method embodiments of the present disclosure.

The terms "an embodiment" or "one embodiment" throughout the specification mean that specific features, structures, or characteristics related to embodiments of the present disclosure are included in at least one embodiment of the present disclosure. Therefore, wherever "in one embodiment" or "in an embodiment" does not necessarily refer to a same embodiment. Furthermore, the specific features, structures, or characteristics can be combined in any suitable manner in one or more embodiments. In embodiments of the present disclosure, the sizes of the process numbers mentioned above do not necessarily imply a sequential order of execution. The execution order of the processes should be determined by functions and internal logic of the processes, rather than constituting any limitation on the implementation process of embodiments of the present disclosure. The process numbers of above embodiments of the present disclosure are only for descriptive purposes and do not represent the quality of embodiments.

The terms "comprise," "include," or any other variations thereof are intended to encompass non-exclusive inclusion, such that a process, method, article, or device that includes a series of elements does not only include those elements, but can include other elements not expressly listed or elements inherent to such process, method, article, or device. When there are no further limitations, the element defined by "including a" does not necessarily exclude that the process, method, article, or device including the element also includes additional same elements.

In embodiments of the present disclosure, the disclosed device and method can also be implemented in another method. The described device embodiments are exemplary. For example, the division of the units is merely a logical functional division. In some embodiments, the units can be divided in another method. For example, a plurality of units or assemblies can be combined or integrated into another system. Some features can be ignored or may not be executed. In addition, the coupling, direct coupling, or communicative connection between the displayed or discussed components can be through the indirect coupling or communicative connection between some interfaces, devices, or units, which can be electrical, mechanical, or in another form.

The above units used as separated members may be or may not be physically separated. The members displayed as units may be or may not be physical units. The members can be located at a position or distributed onto a plurality of network units. Some or all of the units may be selected to implement the purpose of the technical solution of the present disclosure as needed.

In addition, the functional units of embodiments of the present disclosure can be integrated into a processor, or each of the functional units can be used as an independent unit. In some other embodiments, two or more of the functional units can be integrated into one unit. The integrated unit can be embodied by hardware or a combination of hardware and software.

Those of ordinary skill in the art can understand that all or some steps of the above method embodiments can be completed by the hardware related to the program instructions. The program can be stored in the computer-readable storage medium. When the program is executed, the steps of the above method embodiments can be performed. The storage medium can include a medium that can store the program codes, such as a mobile storage device, a read-only memory (ROM), a magnetic disc, or an optical disc.

In some other embodiments, when the integrated unit is implemented by a software functional module and is sold or applied as an independent product, the integrated unit can also be stored in the computer-readable storage medium. Based on this understanding, the essence or the part contributing to the related technology of the technical solution of embodiments of the present disclosure can be embodied by a software product. The computer software product can be stored in a storage medium including several instructions to cause the electronic device (e.g., the cell phone, the tablet, the laptop, the desktop, etc.) to execute all or a part of the method of embodiments of the present disclosure. The above storage medium can include any medium that can store the program codes, such as the mobile storage device, ROM, magnetic disc, or optical disc.

The methods of embodiments of the present disclosure can be combined arbitrarily when there is no conflict to obtain a new method embodiment.

The features of product embodiments of the present disclosure can be combined arbitrarily when there is no conflict to obtain new product embodiments.

The features of method or device embodiments of the present disclosure can be combined arbitrarily when there is no conflict to obtain new method or device embodiments.

The above are merely some embodiments of the present disclosure and do not intend to limit the present disclosure. Those skilled in the art can easily think of modifications or replacements within the scope of the present disclosure. These modifications or replacements are also within the scope of the present disclosure. Thus, the scope of the present disclosure is subject to the scope of the claims.

What is claimed is:

1. An image display method comprising:
  determining a first position and a second position in a target interface, the target interface being a stereoscopic interface perceived by a viewer through one or more images, and the first position and the second position having different depth values; and
  transforming a display position of a target element in the target interface from the first position to the second position, including:
    during a transformation process, fading a color of the target element to cause the target element to disappear at the second position; or
    during the transformation process, reducing a size of the target element to cause the target element to disappear at the second position;

wherein during the transformation process, the target element has an intermediate display position, and a depth value of the intermediate display position is between a depth value of the first position and a depth value of the second position.

2. The method according to claim 1, wherein determining the first position and the second position in the target interface includes:
  in response to the target interface being switched from a first scene to a second scene, determining the first position according to the first scene, and determining the second position according to the second scene.

3. The method according to claim 2, wherein determining the first position according to the first scene includes:
  determining the first position according to a focus point of a viewer in the first scene.

4. The method according to claim 2, wherein determining the first position according to the first scene further includes:
  determining the first position according to a position of a first element in the first scene.

5. The method according to claim 4, further comprising:
  determining the first element in the first scene according to a size of an image element;
  determining the first element in the first scene according to a depth value of a display position of the image element; or
  determining the first element in the first scene according to interactive attribute information of the image element.

6. The method according to claim 2, wherein the target element is an image element located at the first position in the first scene.

7. The method according to claim 1, wherein:
  the display position of the target element follows a sight of the viewer to move; and
  in response to the target element and a second element in the target interface coinciding with the sight of the viewer and having different depth values, the first position is a position of the target element, and the second position is a position of the second element.

8. The method according to claim 7, wherein in response to the sight of the viewer moving away from the second element and not coinciding with other elements except the target element:
  the depth value of the target element remains unchanged during a moving process; and
  the other elements do not include a background image.

9. An electronic device comprising:
  a processor; and
  a memory storing a computer program that, when executed by the processor, causes the processor to:
    determine a first position and a second position in a target interface, the target interface being a stereoscopic interface perceived by a viewer through one or more images, and the first position and the second position having different depth values; and
    transform a display position of a target element in the target interface from the first position to the second position, including:
      during a transformation process, fading a color of the target element to cause the target element to disappear at the second position; or
      during the transformation process, reducing a size of the target element to cause the target element to disappear at the second position;
    wherein during the transformation process, the target element has an intermediate display position, and a depth value of the intermediate display position is between a depth value of the first position and a depth value of the second position.

10. The device according to claim 9, wherein the processor is further configured to:

in response to the target interface being switched from a first scene to a second scene, determine the first position according to the first scene, and determining the second position according to the second scene.

11. The device according to claim 10, wherein the processor is further configured to:

determine the first position according to a focus point of a viewer in the first scene.

12. The device according to claim 10, wherein the processor is further configured to:

determine the first position according to a position of a first element in the first scene.

13. The device according to claim 12, wherein the processor is further configured to:

determine the first element in the first scene according to a size of an image element;

determine the first element in the first scene according to a depth value of a display position of the image element; or determine the first element in the first scene according to interactive attribute information of the image element.

14. The device according to claim 10, wherein the target element is an image element located at the first position in the first scene.

15. An image display method comprising:

determining a first position and a second position in a target interface, the target interface being a stereoscopic interface perceived by a viewer through one or more images, and the first position and the second position having different depth values; and transforming a display position of a target element in the target interface from the first position to the second position, during a transformation process, the target element having an intermediate display position, and a depth value of the intermediate display position being between a depth value of the first position and a depth value of the second position;

wherein:

the display position of the target element follows a sight of the viewer to move;

in response to the target element and a second element in the target interface coinciding with the sight of the viewer and having different depth values, the first position is a position of the target element, and the second position is a position of the second element; and in response to the sight of the viewer moving away from the second element and not coinciding with other elements except the target element:

the depth value of the target element remains unchanged during a moving process; and the other elements do not include a background image.

* * * * *